(12) United States Patent
Nakamura et al.

(10) Patent No.: US 8,004,996 B2
(45) Date of Patent: Aug. 23, 2011

(54) MOBILE COMMUNICATION APPARATUS

(75) Inventors: Takafumi Nakamura, Hino (JP);
Atsushi Wakayama, Hachioji (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 610 days.

(21) Appl. No.: 12/128,695

(22) Filed: May 29, 2008

(65) Prior Publication Data
US 2009/0156261 A1    Jun. 18, 2009

(30) Foreign Application Priority Data

Dec. 13, 2007 (JP) ................ P2007-322553
Dec. 13, 2007 (JP) ................ P2007-322554

(51) Int. Cl.
*G01R 31/08* (2006.01)
(52) U.S. Cl. .......... 370/241; 455/343.1; 455/343.2; 455/343.4
(58) Field of Classification Search .......... None
See application file for complete search history.

(56) References Cited

U.S. PATENT DOCUMENTS

| 2007/0213028 A1* | 9/2007 | Shohara et al. ............ 455/343.1 |
| 2008/0151761 A1* | 6/2008 | Theisen et al. ............. 370/241 |

FOREIGN PATENT DOCUMENTS

| JP | 10-145285 A | 5/1998 |
| JP | 2003-244316 A | 8/2003 |

* cited by examiner

*Primary Examiner* — Phuoc Doan
(74) *Attorney, Agent, or Firm* — Maschoff Gilmore & Israelsen

(57) ABSTRACT

According to an embodiment of the invention, a mobile communication apparatus includes: a first processor; a second processor; an intermittent receiver that is operated using the first processor; and a timer processing unit that is operated using the first processor and the second processor and configured to determine a start time of an operation thereof by performing a time-out control based on a timer, wherein the timer processing unit sets the timer so that a time-out occurs at a given timing, to perform a first function to be started at the given timing, and wherein the timer processing unit sets the timer so that a time-out occurs at a time when the intermittent receiver is operated, to perform a second function to be started at an arbitrary timing.

13 Claims, 11 Drawing Sheets

FIG. 4
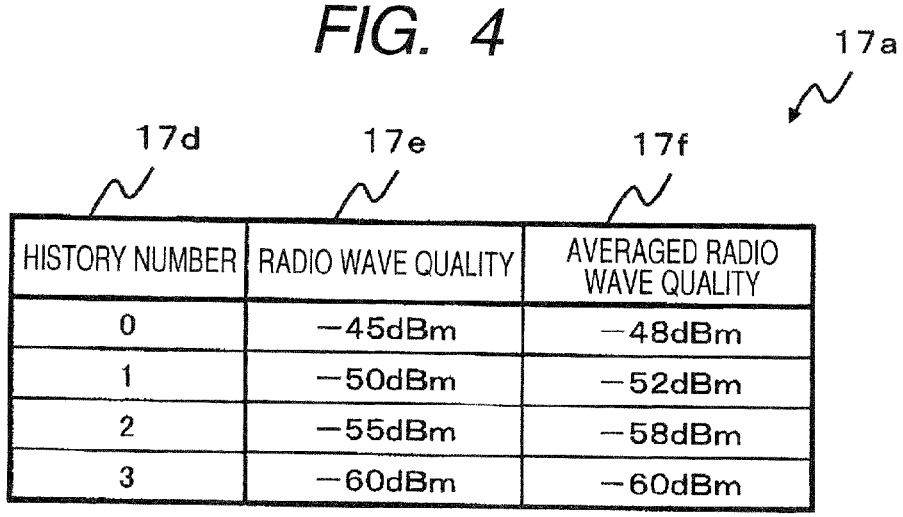
FIG. 5
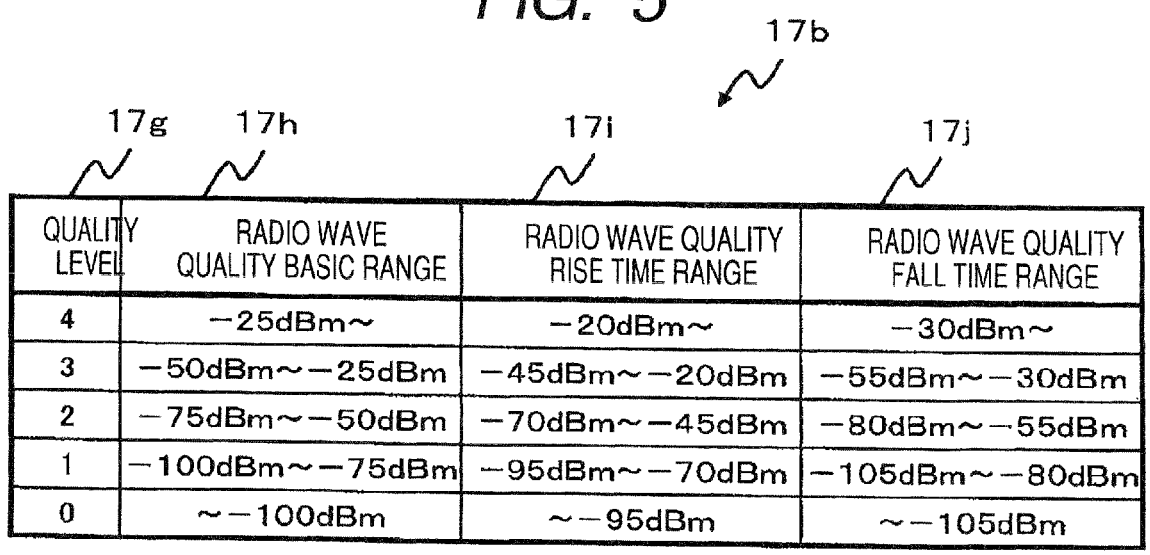
FIG. 6
| 3 |
|---|

FIG. 12
(a) SITUATION OF NOT INFORMING DETERMINED QUALITY LEVEL
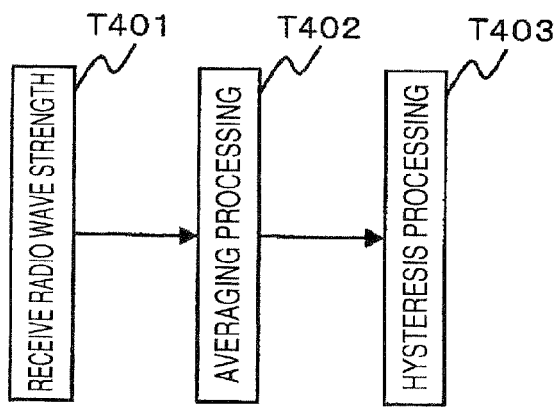
(b) SITUATION OF INFORMING DETERMINED QUALITY LEVEL
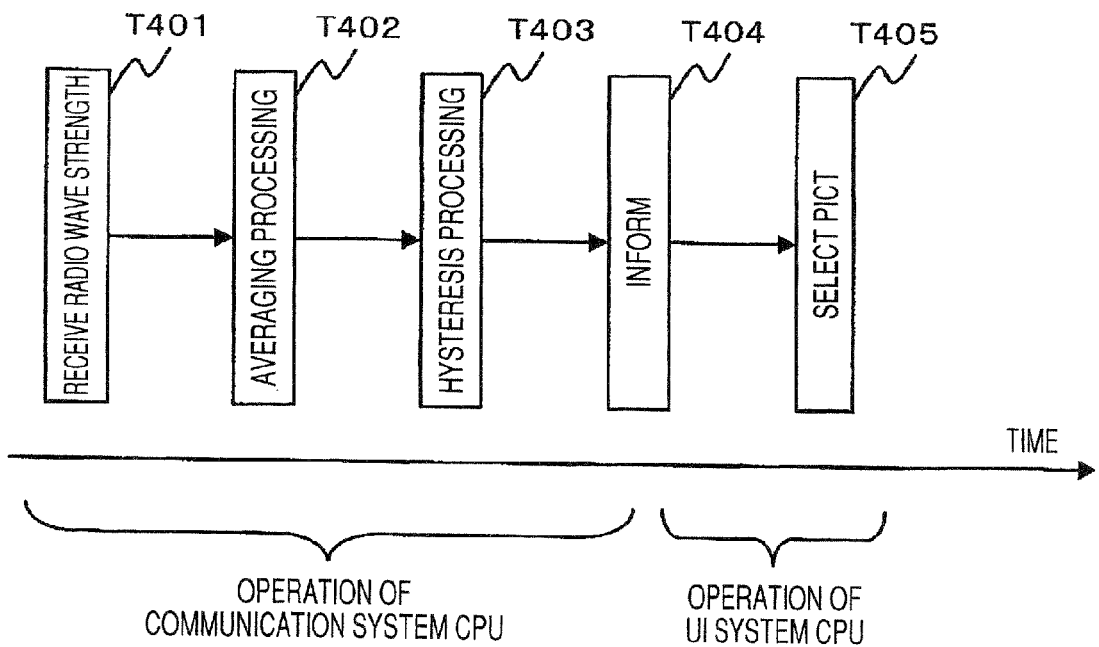

MOBILE COMMUNICATION APPARATUS

CROSS-REFERENCE TO RELATED APPLICATIONS

This application is based upon and claims the benefit of priority from Japanese Patent Application No. 2007-322553 and 2007-322554, both filed Dec. 13, 2007, the entire contents of which are incorporated herein by reference.

BACKGROUND OF THE INVENTION

1. Field

The present invention relates to a mobile communication terminal apparatus, particularly relates to a processing of reducing power consumed by a mobile communication terminal apparatus including two CPUs (Central Processing Unit).

2. Related Art

There is known a mobile communication terminal apparatus including two CPUs of a communication CPU used for operating a communication system and a user interface CPU used for user interface operation including display. It is known that the communication CPU is started when a communication operation is carried out, the user interface CPU is started when a dialogue operation with a user including display is carried out and when the respective operations have been finished, the respective CPUs reduce power consumption by low speed formation of a clock or the like.

Even when an apparatus is brought into a standby state, that is, a communication operation by an intention of the user is not carried out and the dialogue operation by the user is not carried out, it is necessary that the communication CPU carries out an intermittent receiving operation by being awakened intermittently. That is, it is necessary to investigate whether an incoming signal is transmitted from a base station to the apparatus. In the case of intermittent reception, the communication CPU is operated.

Further, even when the dialogue operation with the user is not carried out, there is a case in which the interface CPU informs that there is an incoming message which has not been called to the user by, for example, lighting LED by a predetermined period. Further, when predetermined time arrives, there is a case of informing the arrival of time. The user interface CPU is operated by the predetermined period or when the predetermined time arrives.

Here, it is particularly requested to reduce power consumed by two CPUs in the case of intermittent reception. Because a time period of bringing the apparatus into the standby state is long. Generally, useless power is consumed until CPU is started and is operated stably. Hence, it is known that power consumption can be reduced by reducing a number of times of starting CPU by making the CPU carry out other operation along therewith at time at which the CPU carries out an intermittent receiving operation (refer to JP-A-10-145285 (page 2, FIG. 2)).

However, according to the above-described method disclosed in JP-A-10-145285, it is not clear by what processing power consumption can be reduced in the apparatus having two CPUs.

On the other hand, a quality of a radio wave transmitted from the base station, for example, a strength of a signal to noise ratio is measured, a quality level of the radio wave is determined by comparing the measured quality of the radio wave with a predetermined threshold and the determined radio wave quality level is transmitted to a user interface CPU. In the intermittent reception, a communication CPU is operated.

Further, the user interface CPU displays an image in correspondence with a determined radio wave quality level at a pict column of a display portion. In order to carry out the display, the user interface CPU is operated.

Here, a power consumed by two CPUs in the intermittent reception is particularly requested to reduce. Because a time period of bringing the apparatus into a standby state is long. Hence, it is preferable that a number of times of transmitting operations from the communication CPU to the interface CPU is small, and there is known a processing of transmitting the determined radio wave quality level to the user interface CPU only when the determined radio wave quality level differs from a radio wave quality level determined in intermittent reception at a preceding time (refer to JP-A-2003-244316 (page 10, FIG. 2, FIG. 16)).

However, according to the method disclosed in JP-A-2003-244316, the quality of the radio wave is slightly changed at a vicinity of a predetermined threshold, as a result, a determined radio wave quality level is changed even when the radio wave quality is changed between upper and lower sides of the threshold. Therefore, a processing of transmitting the determined radio wave quality level to the user interface CPU is carried out frequently. Further, the interface CPU is operated to receive the determined radio wave quality level transmitted always from the communication CPU, and therefore, always power is consumed.

SUMMARY OF THE INVENTION

According to one embodiment of the present invention, there is provided a mobile communication apparatus including: a first processor; a second processor; an intermittent receiver that is operated using the first processor; and a timer processing unit that is operated using the first processor and the second processor and configured to determine a start time of an operation thereof by performing a time-out control based on a timer, wherein the timer processing unit sets the timer so that a time-out occurs at a given timing, to perform a first function to be started at the given timing, and wherein the timer processing unit sets the timer so that a time-out occurs at a time when the intermittent receiver is operated, to perform a second function to be started at an arbitrary timing.

According to another embodiment of the present invention, there is provided a mobile communication apparatus including: a first processor; a second processor; an intermittent receiver that is operated using the first processor; a timer processing unit that is operated using the second receiver and configured to determine a start time of an operation thereof by performing a time-out control based on a timer, and a power unit configured to control power supply to the intermittent receiver and the timer unit and that is operated by the first processor; wherein, when the second processor starts to operate, the second processor activates the first processor to operate the power unit if the first processor is inactive; wherein the timer processing unit sets the timer so that a time-out occurs at a given timing, to perform a first function to be started at the given timing, and wherein the timer processing unit sets the timer so that a time-out occurs at a time when the intermittent receiver is operated, to perform a second function to be started at an arbitrary timing.

According to one embodiment of the present invention, there is provided a mobile communication apparatus including: a first processor; a second processor; an intermittent receiver that is operated using the first processor; an image selector that is operated using the second processor; and a display configured to display an image data stored in a frame buffer; wherein the intermittent receiver intermittently executes a receiving operation including: (a) receiving radio wave transmitted from a base station and measuring a quality of the received radio wave; (b) determining a quality level by comparing a measured quality with a threshold; and (c) activating the second processor and transmitting the quality level to the image selector if the quality level differs from a quality level transmitted to the image selector at a previous time, wherein, if the image selector receives the quality level transmitted from the intermittently receiver, the image selector selects an image data based on the received quality level to store the selected image data to the frame buffer.

According to one embodiment of the present invention, there is provided a mobile communication apparatus including: a first processor; a second processor; an intermittent receiver that is operated using the first processor; an image selector that is operated using the second processor; and a display configured to display an image data stored in a frame buffer, wherein the intermittent receiver intermittently executes a receiving operation including: (a) receiving radio wave transmitted from a base station and measures a quality of the received radio wave; (b) calculating a weighted average value from the measured quality and a quality measured in the intermittent receiving operation of a predetermined number of times of the past; (c) determining a quality level by comparing the calculated weighted average value with a threshold; and (d) activating the second processor and transmitting the quality level to the image selector if the quality level differs from a quality level determined at a previous time, wherein, if the image selector receives the quality level transmitted from the intermittently receiver, the image selector selects an image data based on the received quality level to store the selected image data to the frame buffer.

According to one embodiment of the present invention, there is provided a mobile communication apparatus including: a first processor; a second processor; an intermittent receiver that is operated using the first processor; an image selector that is operated using the second processor, and a display configured to display an image data stored in a frame buffer; wherein the intermittent receiver intermittently executes a receiving operation including: (a) receiving radio wave transmitted from a base station and measures a quality of the received radio wave; (b) calculating a weighted average value from the measured quality and a quality measured in the intermittent receiving operation of a predetermined number of times of the past; (c) determining a quality level by comparing the calculated weighted average value with a threshold; and (d) activating the second processor and transmitting the quality level to the image selector if the quality level differs from a quality level transmitted to the image selector at a previous time, wherein, if the image selector receives the quality level transmitted from the intermittently receiver, the image selector selects an image data based on the received quality level to store the selected image data to the frame buffer.

BRIEF DESCRIPTION OF THE DRAWINGS

A general architecture that implements the various feature of the invention will now be described with reference to the drawings. The drawings and the associated descriptions are provided to illustrate embodiments of the invention and not to limit the scope of the invention.

FIG. 4 is an exemplary diagram showing an example of a constitution of a radio wave quality history according to the embodiment of the invention.

FIG. 5 is an exemplary diagram showing an example of a constitution of a quality level threshold according to the embodiment of the invention.

FIG. 6 is an exemplary diagram showing an example of a constitution of a quality level history according to the embodiment of the invention.

FIG. 12 is an exemplary timing chart showing a situation of informing or not informing a quality level determined by a radio wave quality level determining portion to the radio wave quality level quality pict selecting portion according to the embodiment of the invention.

DETAILED DESCRIPTION OF THE INVENTION

Figure 1:
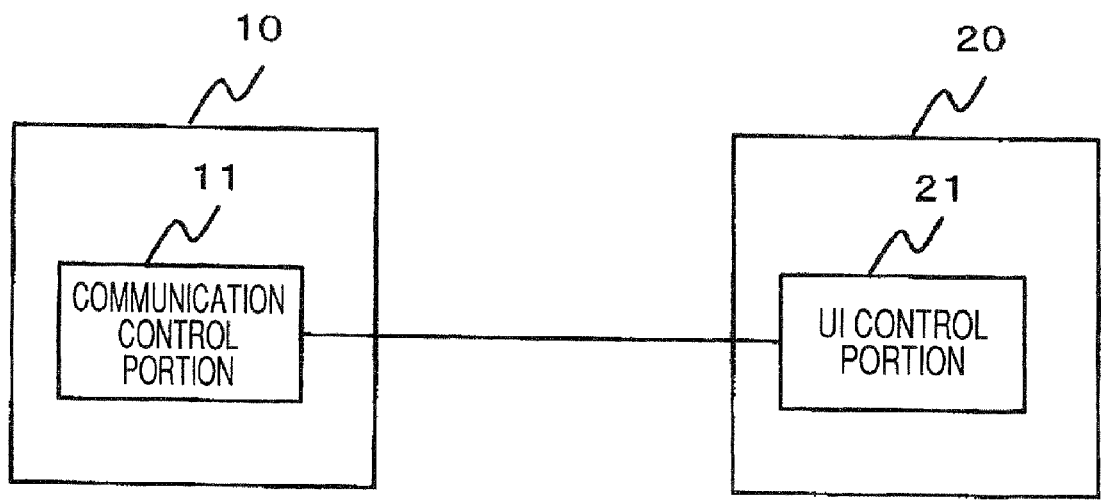
FIG. 1 is an exemplary block diagram showing a constitution of a mobile communication terminal apparatus according to an embodiment of the invention.

An embodiment of a mobile communication terminal apparatus according to the invention will be explained in reference to the drawings as follows. FIG. 1 is a block diagram showing a constitution of a mobile communication terminal apparatus according to an embodiment of the invention. The mobile communication terminal apparatus is constituted by a communication system processing portion 10 and a UI (User Interface) system processing portion 20. The communication system processing portion 10 includes a communication control portion 11 and the UI system processing portion 20 includes a UI control portion 21. Further, the communication control portion 11 and the UI control portion 21 are connected.

Figure 2:
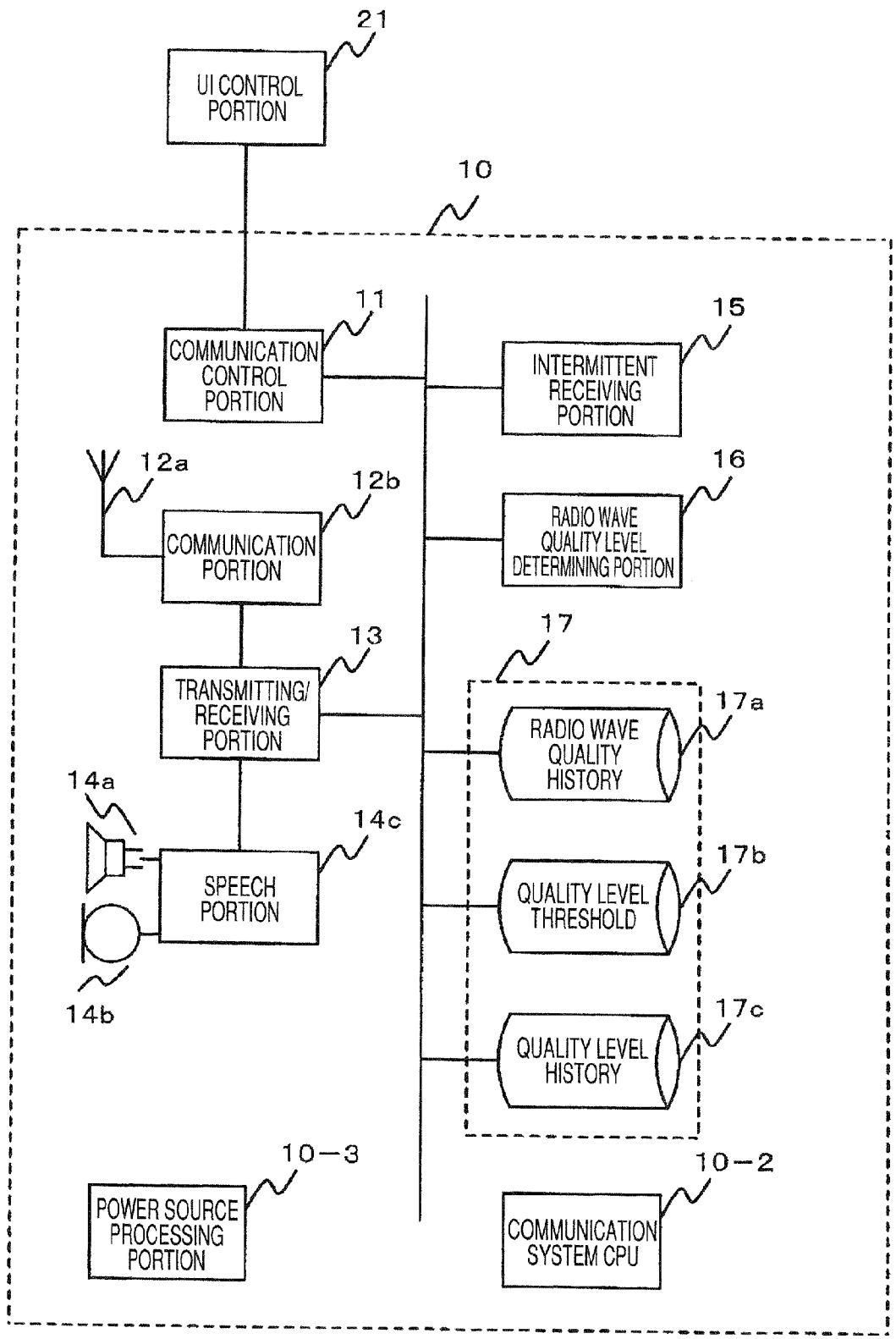
FIG. 2 is an exemplary block diagram showing a constitution of a communication system processing portion according to the embodiment of the invention.

FIG. 2 is a block diagram showing a constitution of the communication system processing portion 10. The communication system processing portion 10 includes the communication control portion 11 for controlling a total of the communication system processing portion 10 and connected to the UI control portion 21, an antenna 12a for transmitting and receiving a radio wave to and from a base station (not illustrated), a communication portion 12b, a transmitting/receiving portion 13, a speaker 14a for generating receiving voice, a microphone 14b for inputting transmitting voice, a speech portion 14c, an intermittent receiving portion 15, a radio wave quality level determining portion 16, and a radio wave quality data storing portion 17. The radio wave quality data storing portion 17 is stored with a radio wave quality history 17a, a quality level threshold 17b, and a quality level history 17c.

Further, the communication system processing portion 10 includes a communication system CPU 10-2 and a power source processing portion 10-3. Further, the communication control portion 11, the intermittent receiving portion 15, the radio wave quality level determining portion 16, and the power source processing portion 10-3 are constituted by programs utilizing the communication system CPU 10-2. When the respective portions utilizing the communication system CPU 10-2 are not operated, the communication system CPU 10-2 stops operating. Further, when the respective portions start operating, the communication system CPU 10-2 is started to start an operation.

The power source processing portion 10-3 controls to supply power stored in a storage battery (not illustrated) to respective operating portions when there are respective portions of the apparatus including respective portions constituting the UI system processing portion 20 and the respective operating portions. Therefore, when the respective portions constituting the UI system processing portion 20 are operated, even in a case in which respective portions constituting the communication portion processing system 10 are not operated, the power source processing portion 10-3 is operated, and therefore, the communication system CPU 10-2 is operated. Further, when a charger (not illustrated) is connected to the apparatus, the power source processing portion 10-3 controls to charge the storage battery pertinently by a power applied from the charger.

Figure 3:
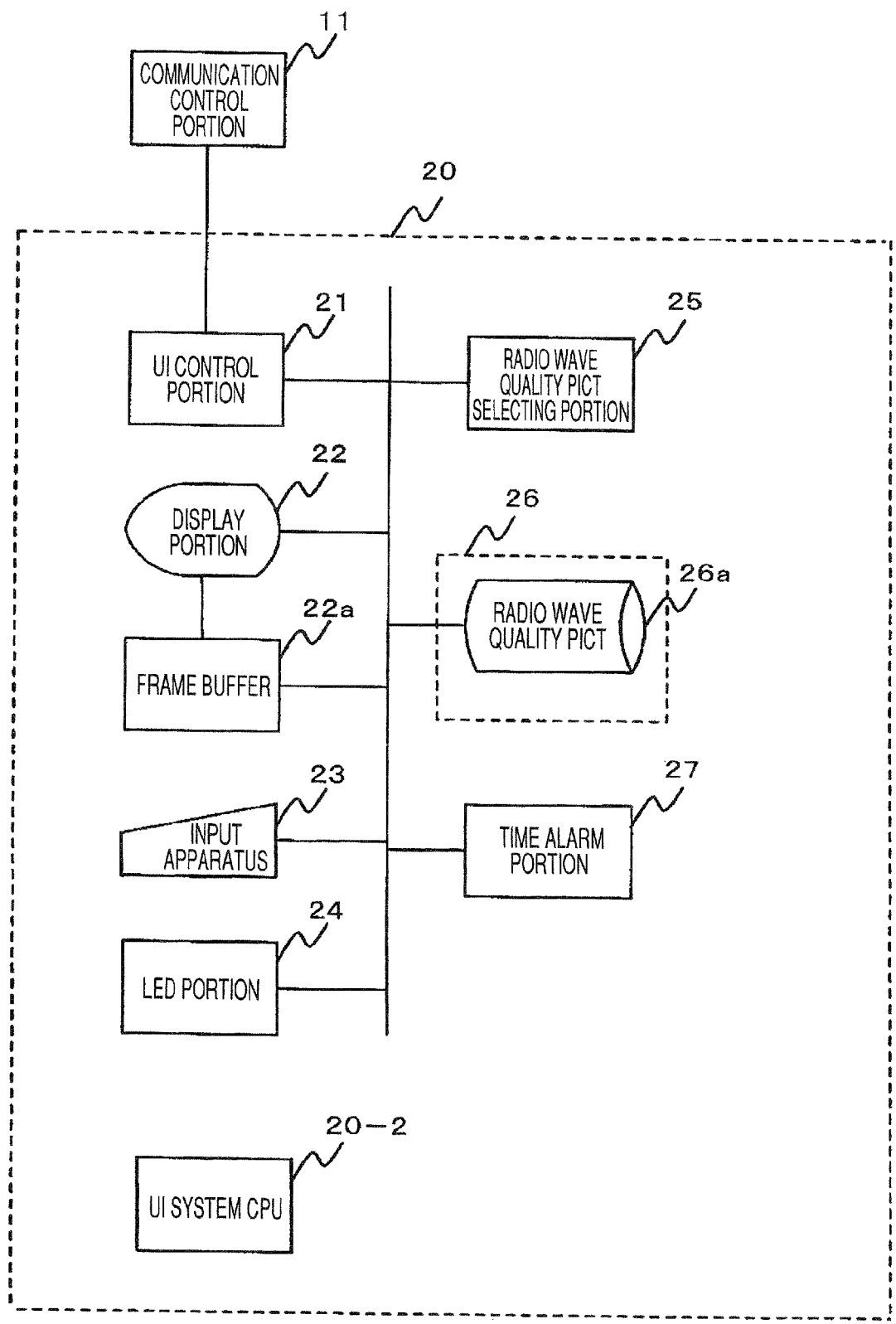
FIG. 3 is an exemplary block diagram showing a constitution of a UI system processing portion according to the embodiment of the invention.

FIG. 3 is a block diagram showing a constitution of the UI system processing portion 20. The UI system processing portion 20 includes the UI control portion 21 for controlling a total of the UI system processing portion 20 and connected to the communication control portion 11, a display portion 22, a frame buffer 22a, an input apparatus 23, an LED (Light Emitting Diode) portion 24, a radio wave quality pict selecting portion 25, a radio wave quality pict storing portion 26, and a time alarm portion 27. The radio wave quality pict storing portion 26 is stored with a radio wave quality pict 26a.

Further, the UI system processing portion 20 includes a UI system CPU 20-2, and the UI control portion 21, the radio wave quality pict selecting portion 25, and the time alarm portion 27 are constituted by programs utilizing the UI system CPU 20-2. When respective portions utilizing the UI system CPU 20-2 are not operated, the UI system 20-2 stops operating. Further, when the respective portions start operating, the UI system CPU 20-2 is started to start operating.

An explanation will be given of operations of respective portions of the mobile communication terminal apparatus according to the embodiment of the invention constituted as described above in reference to FIG. 2 and FIG. 3.

When an incoming signal is received, the communication control portion 11 transmits the incoming signal to the UI control portion 21. Further, the communication control portion 11 transmits an outgoing call signal and an incoming call signal transmitted from the UI control portion 21 by controlling the transmitting/receiving portion 13. Further, the communication control portion 11 intermediates communication between the respective portions in the communication processing portion 10 and the respective portions in the UI system processing portion 20.

The communication portion 12b outputs a high frequency signal received by the antenna 12a to the transmitting/receiving portion 13 and transmits a high frequency signal outputted from the transmitting/receiving portion 13 from the antenna 12a.

The transmitting/receiving portion 13 subjects the high frequency signal from the communication portion 12b to amplification, frequency conversion and demodulation to thereby provide a digital signal and transmits provided speech voice signal to the speech portion 14c and transmits a control signal including an incoming signal to the communication control portion 11. Further, the transmitting/receiving portion 13 measures quality of radio wave received by the antenna 12a by the high frequency signal from the communication portion 12b.

Further, the transmitting/receiving portion 13 subjects the digital signal, that is, the speech voice signal outputted from the speech portion 14c and the control signal outputted from the communication control portion 11 to modulation, frequency conversion and amplification to provide a high frequency signal to transmit to the communication portion 12b to transmit.

The speech portion 14c converts the digital voice signal outputted from the transmitting/receiving portion 13 into an analog voice signal to amplify to transmit to the speaker 24a. Further, the speech portion 14c amplifies the analog voice signal outputted from the microphone 14b to convert into a digital voice signal to transmit to the transmitting/receiving portion 13.

The intermittent receiving portion 15 is started by the communication control portion 11 and starts an intermittent receiving operation in accordance with a timer processing of the communication control portion 11 which is carried out by a predetermined intermittent awakening period, that is, at each 5.12 seconds. Further, the intermittent receiving portion 15 makes a radio wave transmitted from the base station received by controlling the transmitting/receiving portion 13 and when an incoming signal is included, the intermittent receiving portion 15 informs the communication control portion 11 that the signal is received. Further, when quality of radio wave transmitted from the base station is worse than a predetermined value, the intermittent receiving portion 15 reselects the base station or carries out hand over. Further, the intermittent receiving portion 15 starts the radio wave quality level determining portion 16.

The radio wave quality level determining portion 16 is started by the intermittent receiving portion 15, that is, started at each time of intermitting reception and determines a quality level of radio wave from quality of radio wave measured by the transmitting/receiving portion 13, that is, a strength of the radio wave (RSSI, Received Signal Strength Indicator). In the determination, the radio wave quality level determining portion 16 refers to updates information stored in the radio wave quality data storing portion 17.

Further, when the determined quality level differs from a quality level informed to the UI control portion 21 at immediate past, the radio wave quality level determining portion 16 finishes operation by informing the quality level to the UI control portion 21. In the informing, when the UI system CPU 20-2 stops operating, the operation is started. When the determined quality level is the same as the quality level informed to the UI control portion 21 in the immediate past, the radio wave quality level determining portion 16 stops operating.

When an incoming signal is received from the communication control portion 11, the UI control portion 21 informs that the signal is received by making a second speaker (not illustrated) used for informing the incoming signal output incoming signal sound. Further, when an incoming call operation and an outgoing call operation are carried out by a predetermined operation of the input apparatus 23, the UI control portion 21 transmits the incoming call signal and the outgoing call signal to the communication control portion 11.

Further, when the incoming signal is received and a predetermined time period has elapsed without carrying out the incoming call operation by a predetermined operation of the input apparatus 23, the UI control portion 21 informs that there is an incoming signal by which the incoming call operation is not carried out, that is, an absent incoming message by intermittently lighting the LED portion 24. Further, the apparatus includes an electronic mail transmitting/receiving portion (not illustrated) and the UI control portion 21 similarly informs that there is an unread mail. Further, even when there are an absent incoming message and an unread mail, the UI control portion 21 similarly informs that there are the absent incoming signal and the unread mail, hereinafter, the informing is referred to as informing that there is the absent incoming signal or the like.

In order to start respective intermittent lighting, that is, lighting over a short time period, the UI control portion 21 uses a timer processing of the UI control portion 21. Further, the UI control portion 21 intermediates communication between respective portions of the UI system processing portion 20 and respective portions in the communication system processing portion 10.

The display portion 22 is, for example, LCD (Liquid Crystal Display) and starts operating to display character, numeral or image data stored to the frame buffer 22a by being controlled by the UI control portion 21. The display operation is continued without depending on the operation of the UI control portion 21 after having been controlled to display from the UI control portion 21. Further, the display operation is finished by being controlled by the UI control portion 21.

The input apparatus 23 is constituted by keys including numerals keys and a plurality of function keys for designating a telephone number or the like of a communication counter party. Further, when the key of the input apparatus 23 is operated, an identifier of the key is informed to the UI control portion 21, and the key is displayed as a character on the display portion 22, or a control is carried out by the UI control portion 21. Here, there is a case in which the UI control portion 21 makes the communication control portion 11 carry out the control by transmitting a control signal.

When the quality level informed from the radio wave quality level determining portion 16 is received, the radio wave quality pict selecting portion 25 selects a pict image in accordance with the quality level in reference to the radio wave quality pict 26a and makes the frame buffer 22a store the selected pict image. The image stored to the frame buffer 22a including the pit image is displayed on the display portion 22 by being controlled by the UI control portion 21.

The time alarm portion 27 inputs time by a predetermined key operation of the input apparatus 23 and is stored with the inputted time as an attribute of the time alarm operation. Further, when the time arrives, the time alarm portion 27 is started to start operation and makes predetermined alarm sound outputted from the second speaker. Further, a predetermined alarm image is stored to the frame buffer 22a and informed to the UI control portion 21 to display the image stored to the frame buffer 22a including the predetermined alarm image at the display portion 22. The time alarm portion 27 uses the timer processing of the UI control portion 21 for a processing of starting operation by arrival of the predetermined time.

An explanation will be given of a processing of reducing a number of times of starting CPU of the mobile communication terminal apparatus according to the embodiment of the invention as follows.

FIG. 4 shows an example of a constitution of the radio wave quality history 17a stored to the radio wave quality data storing portion 17. The radio wave quality history 17a is constituted by information in which a history 17d, a radio wave quality 17e and an averaged radio wave quality 17f are related.

The history number 17d is a natural number from "0" to "3" and the radio wave quality history 17a is constituted by 4 sets of related information. The history number 17d constituting "0" shows that information related to the history number 17d is information of radio wave quality provided in the newest intermittent reception, the history number 17d constituting "1" shows that information related to the history number 17d is information of radio wave quality provided in intermittent reception at a preceding time.

Hereinafter, similarly, "2" shows information of a radio wave quality provided at intermittent reception at a time preceding to the preceding time, and "3" shows information of radio wave quality provided in intermittent reception 3 times before. Further, although according to the embodiment, the radio wave quality history 17a is constituted by 4 sets of related information, the invention is not limited thereto. The radio wave quality history 17a may be constituted by a fewer sets of information, or may be constituted by more sets of information.

The radio wave quality 17e is radio wave quality provided in intermittent reception at respective times. The averaged radio wave quality 17f is radio wave quality calculated by calculating by subjecting radio wave quality provided in intermittent reception at the time and radio wave quality provided at interval reception before the time to weighted average. Further, as described later, as the averaged radio wave quality 17f, only information related to the history number 17d constituting "0" and information related to the history number 17d constituting "1" are used, and therefore, information related to other history number 17d may not be stored.

Further, although in FIG. 4, an illustration is provided such that the history number 17d, the radio wave quality 17e, and the averaged radio wave quality 17f are continuously stored and the related information are continuously stored, the illustration is for facilitating understanding and the invention is not limited thereto. For example, there may be constructed a constitution in which the information is stored discretely and an interval between discrete portions is connected by a pointer.

FIG. 5 shows an example of a constitution of the quality level threshold 17b stored to the radio wave quality data storing portion 17. The quality level threshold 17b is constituted by information related with a quality level 17g, a radio wave quality basic range 17h, a radio wave quality rise time range 17i and a radio wave quality fall time range 17j.

The quality level 17g is a quality level of a radio wave and a value of any of 5 integers from "0" to "4" and the quality level threshold 17b is constituted by 5 sets of related information. The quality level 17g shows that the larger the integer, the better the quality and a small integer shows a worse quality.

The radio wave quality basic range 17h is constituted by values indicating two radio wave qualities (the value includes −∞ and +∞) showing that when the averaged radio wave quality 17f of the radio wave quality history 17a is present between values indicating the two radio wave qualities, the level of the radio wave quality is basically the value of the quality level 17g related to the radio wave quality basic range 17h.

In reference to the radio wave quality basic range 17h exemplified in FIG. 5, when the averaged radio wave quality 17f is equal to or larger than −25 dBm (in other words, an interval from −25 dBm to +∞) the quality level 17g is determined to be "4", that is, the highest level, and when the averaged radio wave quality 17f is present between −50 dBm to −25 dBm, the quality level 17g is determined to be "3". Further, when the averaged radio wave quality 17f is equal to or smaller than −100 dBm (in other words, the interval between −∞ to −100 dBm), the quality level 17g is determined to be "0", that is, the lowest level.

Here, for example, −25 dBm constituting the value of the averaged radio wave quality 17f becomes a threshold by which the quality level 17g is determined to be "4" or determined to be "3". Therefore, when the averaged radio wave quality 17f is changed frequently around −25 dBm, for example, between −24 dBm and −26 dBm, the quality level 17g is determined to be "4" and determined to be "3", the quality level 17g is changed frequently, which is not preferable as described later.

Hence, for a processing in which the quality level 17g is not changed frequently, the quality level threshold 17b is constructed by a constitution that the information related to the quality level 17g is constituted by the radio wave quality rise time range 17i and the radio wave quality fall time 17j along with the radio wave quality basic range 17h.

That is, the radio wave quality rise time range 17 is constituted by values of adding 5 dBm to all of values stored to the radio wave quality basic range 17h and used in determining the quality level 17g when the value of the averaged radio wave quality 17f rises. On the other hand, the radio wave quality fall time range 17j is constituted by values subtracting 5 dBm from all of the values stored to the radio wave quality basic range 17h and used in determining the quality level 17g when the value of the averaged radio wave quality 17f falls.

By determining the quality level 17g in reference to the radio wave quality rise time range 17i and the radio wave quality fall time range 17j, the quality level 17g is prevented from being changed frequently by slightly changing the averaged radio wave quality 17f, that is, an hysteresis characteristic can be provided.

Further, although in FIG. 5, an illustration is provided such that the radio wave quality basic range 17h, the radio wave quality rise time range 17i and the radio wave quality fall time range 17j are continuously stored and related information is continuously stored, this is for facilitating understanding and the invention is not limited thereto. For example, there may be constructed a constitution in which the ranges are discretely stored and an interval between discrete portions is connected by a pointer.

FIG. 6 shows an example of a constitution of the quality level history 17g stored to the radio wave quality data storing portion 17. The quality level history 17c is the quality level 17g constituted by one quality level and determined in the intermittent reception at a preceding time.

Figure 7:
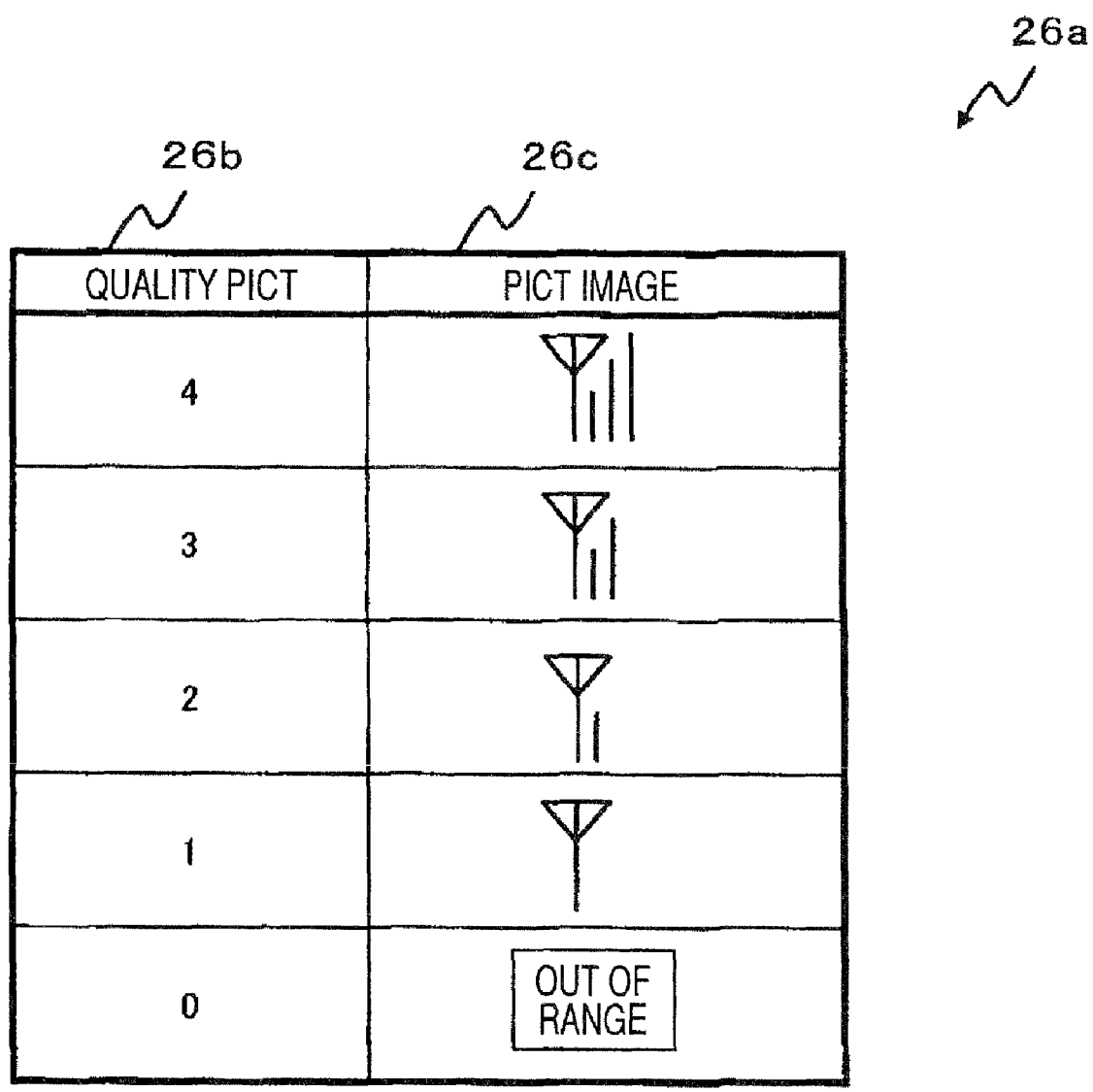
FIG. 7 is an exemplary diagram showing an example of constitution of a radio wave quality pict according to the embodiment of the invention.

FIG. 7 shows an example of a constitution of the radio wave quality pict 26a stored to the radio wave quality pict storing portion 26. The radio wave quality pict 26a is constituted by information related to the quality level 26b and the pict image 26c.

The quality level 26b is constituted by any value of 5 integer values from "0" to "4" similar to the quality level 17g of the quality level threshold 17b and the radio wave quality pict 16a is constituted by 5 sets of related information.

The pict image 26c is constituted by an image constituting a character "out of range", an image constituting an antenna-like line picture, an image constituting an antenna-like line picture and one piece of a vertical bar, an image constituting an antenna-like line picture and two pieces of vertical bars, and an image constituting an antenna-like line picture and 3 pieces of vertical bars related to respective levels of the quality level 16b from "0" to "4".

Further, although in FIG. 7, an illustration is provided such that the quality level 26b and the pict image 26c are continuously stored, and information related thereto is continuously stored, this is for facilitating understanding and the invention is not limited thereto. For example, there may be constructed a constitution in which the information is discretely stored and an interval between discrete portions is connected by a pointer.

Further, the pict image 26c is image information and requires a storage capacity larger than a storage capacity for storing the quality level 26b for storing the pict image 26c. Therefore, the image information may be stored to an exclusive region of storing the image information and the pict image 26c may be stored to an address of region. Further, the image information may be stored as a file, the pict image 26c may be stored with a file name thereof.

Figure 8:
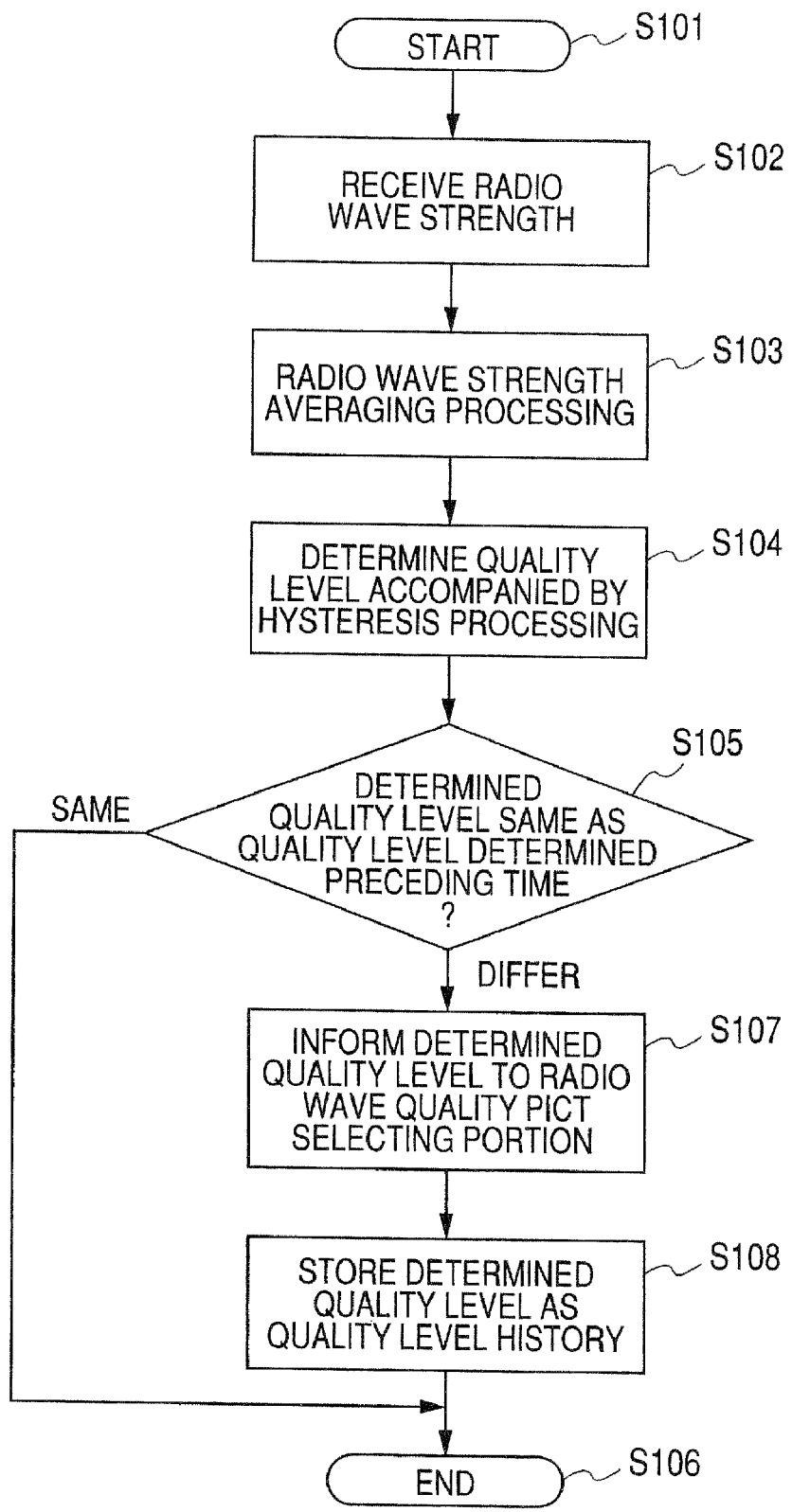
FIG. 8 is an exemplary flowchart of an operation of a radio wave quality level determining portion according to the embodiment of the invention.

Next, an operation of the radio wav quality level determining portion 16 will be explained. FIG. 8 shows a flowchart of the operation of the radio wave quality level determining portion 16. The radio wave quality level determining portion 16 is started by the intermittent receiving portion 15, that is, started as a part of intermittent reception to start operation (step S101), and receives the strength of the radio wave from the transmitting/receiving portion 13 (step S102).

Next, the radio wave quality level determining portion 16 processes to average the radio wave strength, that is, calculates a weighted average value of a newly received radio wave strength and a radio wave strength received in the past such that a determination of the quality level of the radio wave is not changed by a change in a temporary radio wave strength (step S103).

In order to hold to store an order of receiving the radio wave strengths received in the past to store, first, the radio wave quality level determining portion 16 stores the radio wave quality level 17e related to the history number 17d constituting "2" and the averaged radio wave quality 17f to be related to the history number 17d constituting "3".

Nest, the radio wave quality level determining portion 16 stores the radio wave quality 17e related to the history number 17d constituting "1" and the averaged radio wave quality 17f to be related to the history number 17d constituting "2". Further, the radio wave quality level determining portion 16 stores the radio wave quality 17e related to the history number 17d constituting "0" and the averaged radio wave quality 17f to be related to the history number 17d constituting "1".

Further, the radio wave quality level determining portion 16 stores the radio wave strength received at step S102 to the radio wave quality 17e related to the history number 17d constituting "0". Next, the radio wave quality level determining portion 16 calculates the radio wave quality 17e related to the history number 17d constituting "0" through "3", that is, the newly received radio wave strength and the radio wave strengths received in intermittent reception of past 3 times of immediate proximity and stores the related average value to the averaged radio wave quality 17f related to the history number 17d constituting "0".

Further, when the radio wave strengths received in intermittent reception of past 3 times of immediate proximity are not stored, the radio wave quality level determining portion 16 calculates the weighted average value without using a strength which is not stored. When the radio wave strength received in the past is not stored at all, the radio wave quality level determining portion 16 regards the newly received radio wave strength as the weighted average value (not illustrated).

Next, the radio wave quality level determining portion 16 determines the quality level from the newly calculated averaged radio wave quality 17f, that is, the average radio wave quality 17f related to the history number 17d constituting "0" and the averaged radio wave quality 17f calculated in intermittent reception at a preceding time, that is, the averaged radio wave quality 17f related to the history number 17d constituting "1" in reference to a quality level threshold 17b. In the determination, the determination is carried out by being accompanied by the hysteresis processing to restrain a useless change of the quality level (step S104).

That is, when the newly calculated averaged radio wave quality 17f is larger than the averaged radio wave quality 17f calculated in intermittent reception at a preceding time, the radio wave quality level determining portion 16 searches the radio wave quality rise time range 17i including the newly calculated averaged radio wave quality 17f. Further, a value of the quality level 17g related to the searched radio wave quality rise time range 17i is determined as the quality level.

On the other hand, when the newly calculated averaged radio wave quality 17f is smaller than the averaged radio wave quality 17f calculated in intermittent reception at a preceding time, the radio wave quality level determining portion 16 searches the radio wave quality fall time range 17j including the newly calculated averaged radio wave quality 17f. Further, a value of the quality level 17g related to the searched radio wave quality fall time range 17j is determined as the quality level.

Further, when the averaged radio wave quality 17f calculated in intermittent reception of the immediate past, that is, the averaged radio wave quality 17f related to the history number 17d constituting "1" is not stored, the hysteresis characteristic cannot be provided, and therefore, the radio wave quality level determining portion 16 searches the radio wave quality basic range 17h including the newly calculated averaged radio wave quality 17f. Further, a value of the quality level 17g related to the searched radio wave quality basic range 17h is determined as the quality level (not illustrated).

Further, the quality level threshold 17b may not include the radio wave quality rise time range 17i and the radio wave quality fall time range 17j but may include only the radio wave quality basic range 17h. In this case, the radio wave quality level determining portion 16 may calculate a value in correspondence with the radio wave quality rise time range 17i and a value in correspondence with the radio wave quality fall time range 17j from the radio wave quality basic range 17h at each time of intermittent reception.

Next, the radio wave quality level determining portion 16 determines whether the determined quality level is the same as the quality level determined in intermittent reception at a preceding time (step S105). The quality level determined in intermittent reception at a preceding time is stored to the radio wave quality data storing portion 17 as the quality level history 17c, and therefore, the quality level history 17c is referred in order to determine whether the quality levels are the same.

Further, when the quality level determined in intermittent reception at a preceding time is not stored to the radio wave quality data storing portion 17 as the quality level history 17c, the radio wave quality level determining portion 16 determines that the determined quality level differs from the quality level determined in intermittent reception at a preceding time (not illustrated).

When the qualities are the same, the radio wave quality level determining portion 16 finishes operating (step S106). On the other hand, when the qualities differ, the radio wave quality level determining portion informs the determined quality level to the radio wave quality pict selecting portion 25 (step S107), stores the determined quality level as the quality level history 17c (step S108) and finishes operating (step S106).

Further, when the qualities differ and when there is a difference of 2 levels or more, that is, when a difference between the determined quality level and the quality level determined in intermittent reception at a preceding time is 2 or more, the radio wave quality level determining portion 16 may change to make the determined quality level proximate to the quality level determined in intermittent reception at a preceding time such that the difference becomes 1 and the radio wave quality level determining portion 16 may inform the changed quality level and may use the changed quality level to be stored to the radio wave quality pict selecting portion 25 at step S107. According to the processing of making the determined quality level proximate to the quality level determined in intermittent reception at a preceding time, the display of the abrupt change of the quality level is alleviated to be displayed to achieve an effect of avoiding a useless confusion of a user.

The operation of informing the quality level to the radio wave quality pict selecting portion 25 at step S107 is carried out by way of the communication control portion 11 and the UI control portion 21. Further, when the UI system CPU 20-2 is not operated, the CPU is started. Hence, in order to reduce power consumption, a number of times of information is preferably small. According to the operation of the radio wave quality level determining portion 16 explained above, a number of times of informing is minimized by the averaging processing at step S103 and the hysteresis processing at step S104.

Further, at step S105, the radio wave quality level determining portion 16 determines whether the determined quality level and the quality level determined in intermittent reception at a preceding time are the same. This is equivalent to determining whether the determined quality level and the quality level informed to the radio wave quality pict selecting portion 25 immediately therebefore are the same. Because when the quality level is informed to the radio wave quality pict selecting portion 25 immediately therebefore, thereafter, the determined quality level is changed, the changed quality level is informed to the radio wave quality pict selecting portion 25.

Figure 9:
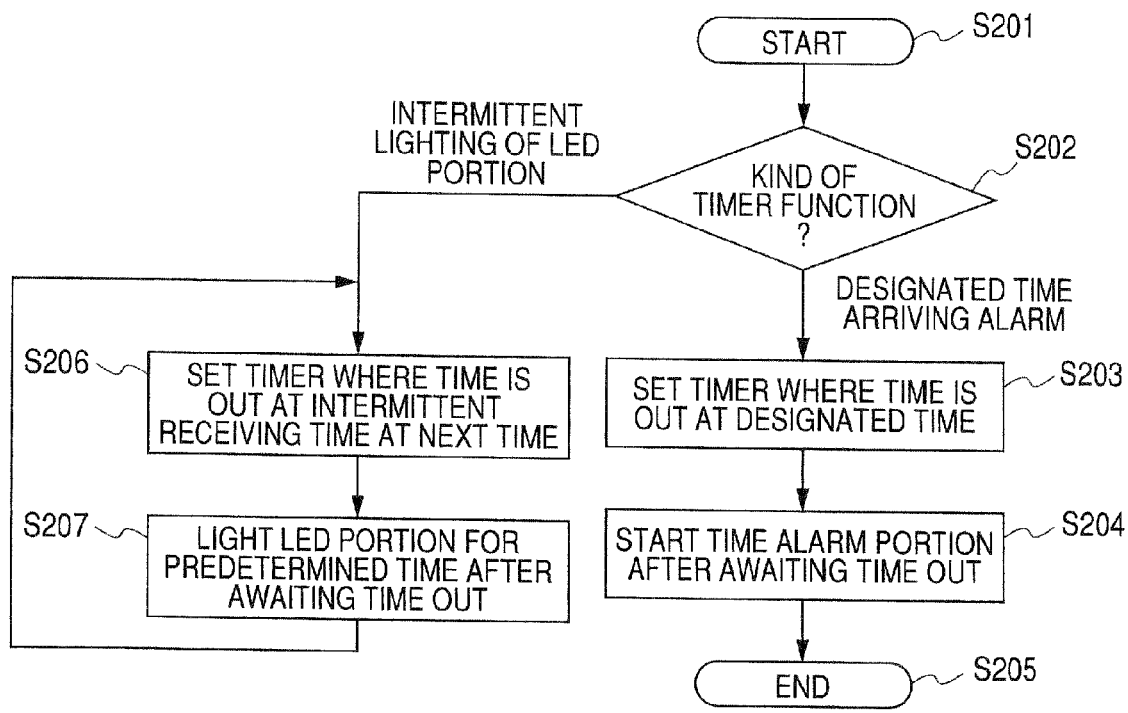
FIG. 9 is an exemplary flowchart of an operation of a timer processing of a UI control portion according to the embodiment of the invention.

Next, an operation of a timer processing of the UI control portion 21 will be explained. FIG. 9 shows a flowchart of the operation of the timer processing of the UI control portion 21. The UI control portion 21 starts the operation of the timer processing by receiving a request of using the timer function (step S201) and determines a kind of a timer function (step S202).

When the kind of the timer function starts an alarm at arrival of designated time from the time alarm portion 27, that is, starts operation by starting the time alarm portion 27, the UI control portion 21 sets a timer of making time out at a designated time (step S203). Further, the time out is awaited, at the time out, the operation of the timer alarm portion 27 is started (step S204) and the operation of the timer processing is finished (step S205).

On the other hand, when the kind of the timer function is intermittent lighting of the LED portion 24 for informing that there is an absent incoming signal or the like, the UI control portion 21 sets a timer of making time out at time at which the intermittent receiving portion 15 carries out intermittent reception at next time (step S206). Further, the time out is awaited, at the time out, lighting of the LED portion 24 is started, after an elapse of a short predetermined time period, the LED portion 24 is switched off (step S207) to proceed to an operation of setting the timer at step S206. The operation of intermittently lighting the LED portion 24 finishes the operation of the timer processing when a predetermined key operation of the input apparatus 23 is carried out (not illustrated).

By informing the time of intermittent reception of the intermitting receiving portion 15 to the UI control portion 21 by the communication control portion 21, the UI control portion 21 can use the time. The operation of informing the UI control portion 21 by the communication control portion 21 is carried out when, for example, the radio wave quality level determining portion 16 informs the quality level to the radio wave quality pict selecting portion 25. Further, the UI control portion 21 can use all of time of intermittent reception by the intermittent receiving portion 15 by adding a number constituted by multiplying an intermittent reception period by positive integer at the informed time. According to the processing, a number of times of starting the UI system CPU 20-2 is not increased by the informing.

In the above-described timer processing, by setting the time of time out to the time of the intermittent reception of the intermittent receiving portion 15, when time is out, the communication system CPU 20-2 is operated. Hence, when time is out, an operation of the power source processing portion 10-3 is needed by operating the UI system CPU 10-2, the processing of starting the communication system CPU 10-2 for operating only the power source processing portion 10-3 is not needed and an effect of reducing power consumption is achieved.

On the other hand, there is a possibility of carrying out a processing of starting the communication system CPU 10-2 for operating only the power source processing portion 10-3 when time is out by setting the time of the time out to an arbitrary time. However, for example, the time alarm portion 27 continues the operation after time is out, and therefore, the operation of the power source processing portion 10-3 is successively needed, that is, the operation of the communication system CPU 10-2 is successively needed. Hence, power consumption is not increased by setting the time of time out to an arbitrary time.

Although according to the example explained above, the kind of the timer function is for starting the time alarm portion 27 at arrival of designated time and intermittently lighting the LED portion 24, the kind of the timer function is not naturally limited thereto.

As a pertinent example of setting the time of time out to arbitrary time, a processing portion (not illustrated) is started for receiving news distributed from news distribution server apparatus (not illustrated) Time of distributing the news is designated by the news distribution server apparatus. Hence, because at arrival of the designated time, it is pertinent to start the processing portion of receiving the news.

On the other hand, in the timer function for the operation which is carried out intermittently, it is effective to set time of time out to time of intermittent reception by the intermittent receiving portion 15. Even when intermittent period of the operation which is carried out intermittently differs from the period of intermittent reception, an effect of reducing power consumption is necessarily achieved although an amount thereof is small. Further, by making the intermittent period of the operation which is carried out intermittently the period of intermittent reception multiplied by an integer, or a quotient divided by an integer, an effect of reducing power consumption is considerable.

Further, as other effective example of the operation which is carried out intermittently and the operation which is carried out at time of intermittent reception of the intermittent receiving portion 15, for example, there is an example in which the UI system processing portion 20 includes a short distance wireless communication portion (not illustrated) and the short distance wireless communication portion transmits and receives information showing a state of the apparatus to and from a communication counter party, for example, hands free speech apparatus. As information showing a state of the apparatus mentioned here, there is information stating that the apparatus is at a standby state, the quality level determined by the radio wave quality level determining portion 16, or a remaining amount of power stored in a storage battery of the apparatus or the like.

Figure 10:
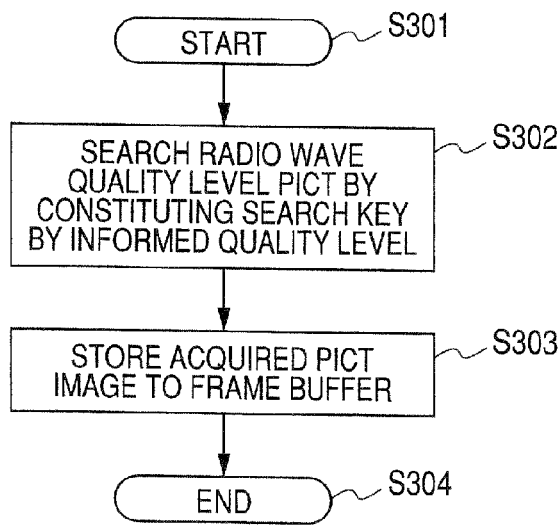
FIG. 10 is an exemplary flowchart of an operation of a radio wave quality pict selecting portion according to the embodiment of the invention.

Next, an operation of the radio wave quality pict selecting portion 25 will be explained. FIG. 10 shows a flowchart of the operation of the radio wave quality pict selecting portion. The radio wave quality pict selecting portion 25 starts operating by being started by the UI control portion 21 by being informed of the quality level (step S301) and searches information that the informed quality level and the quality level 26b are equal from the radio wave quality pict 26a (step S302).

The radio wave quality pict selecting portion 25 acquires the pict image 26c of the related information provided by the search, stores the pict image 26c to a predetermined address of the frame buffer 22a (step S303) and finishes the operation (step S304).

Figure 11:
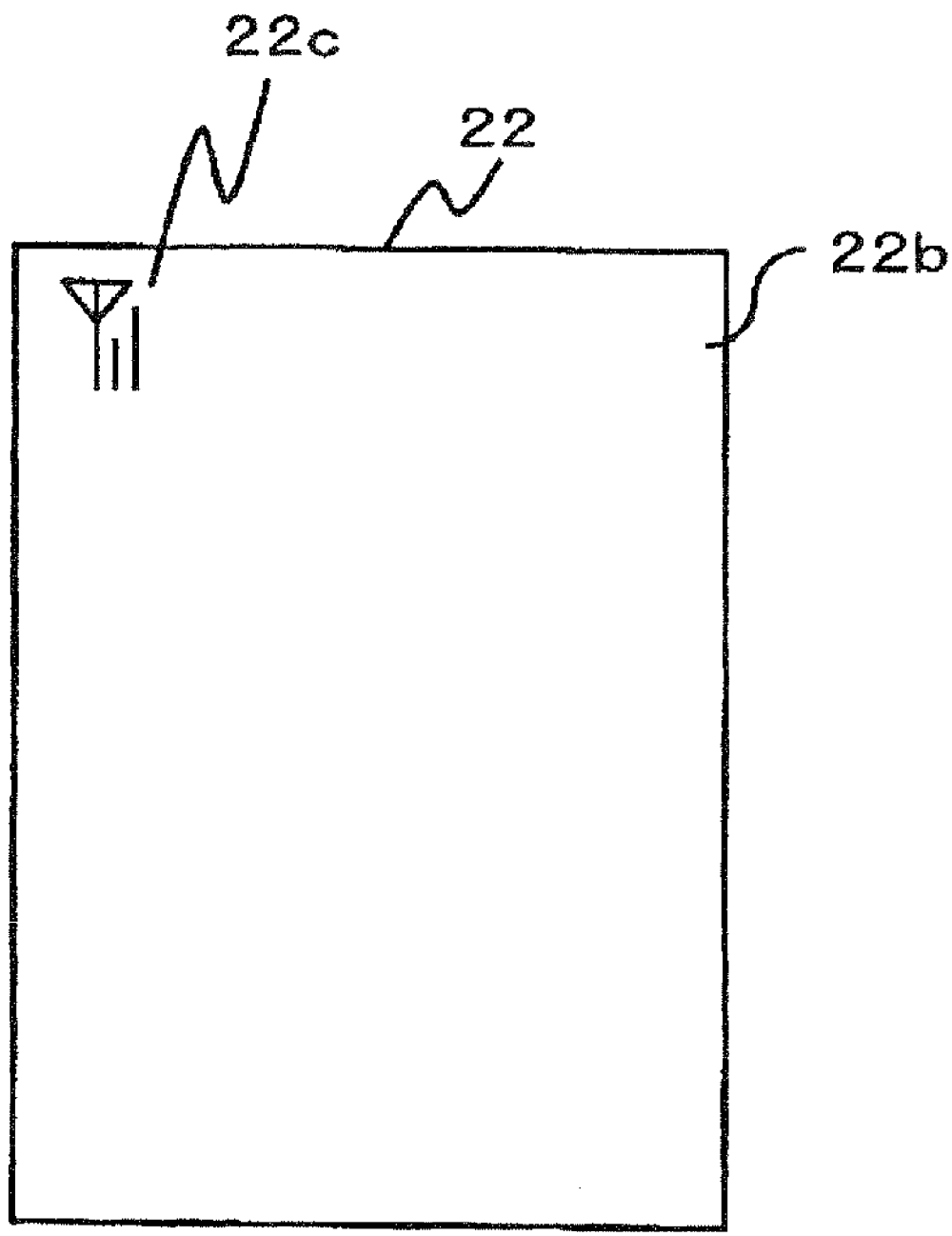
FIG. 11 is an exemplary view showing an example of a situation of displaying an image in correspondence with a radio wave strength at a display portion according to the embodiment of the invention.

When the display portion 22 carries out a display, an image in correspondence with the radio wave strength received by the apparatus is displayed. FIG. 11 shows an example of a situation of displaying the image in correspondence with the radio wave strength. In FIG. 11, a pict image 22c is displayed at the leftmost portion of a pict column 22b constituting an uppermost portion of the display portion 22. As the pict image 22c, the pict image 26c stored to the radio wave quality pict 26a by being related to the quality level 26b constituting "3" is displayed.

Further, even when the display portion 22 does not carry out a display, a pertinent pict image 26c is started always to the frame buffer 22a, and therefore, when the display portion 22 starts displaying, the pertinent pict image 26c is displayed immediately.

Further, when the UI system processing portion 20 includes a second display portion (not illustrated) of displaying an image stored to a second frame buffer (not illustrated) and the UI control portion 21 controls whether the second display portion is made to display, the radio wave quality pict selecting portion 25 displays a pertinent pict image also at the second display portion by storing a pertinent pict image to the second frame buffer.

The pict image displayed at the second display portion may differ from the pict image displayed at the display portion 22. When the pict images differ from each other, at the radio wave quality pict 26a, the pict image displayed at the second display portion may be stored further to be related with the quality level 26b.

The above-described processing of reducing power consumption carried out by the apparatus will be summarized. When the apparatus is brought into the standby state and carries out an intermittent receiving operation, the communication system CPU 10-2 consumes predetermined power indispensable for the intermittent receiving operation. However, the operation of reducing power consumed other than the predetermined power consumption has been explained. That is, the radio wave quality level determining portion 16 informs the determined quality level to the radio wave quality pict selecting portion 25, as a result of informing, power consumed by the UI system CPU 20-2 is reduced by restraining the operation of starting the UI system CPU 20-2 by a small number of times as a result of the informing.

Further, in a case in which when the UI control portion 21 carries out the operation of lighting the LED portion 24 by using the timer processing by the UI system CPU 20-2, the communication system CPU 10-2 is not started in accordance with the operation, the communication system CPU 10-2 is started. At that occasion, by setting time of lighting the LED portion 24 to time of operating the communication system CPU 10-2 for the intermittent receiving operation, a number of times of starting the communication system CPU 10-2 in accordance with lighting the LED portion 24 is reduced. Power consumed by the communication system CPU 10-2 is reduced by the reduction.

Further, time of starting the time alarm portion 27 relates to a designation of the user, it is not proper to set the time to time of operating the communication system CPU 10-2 for the intermittent receiving operation, and by setting the time starting the time alarm portion 27 to be time designated by the user, a convenience of the user is not deteriorated.

Further, in the above-described explanation, reason of starting the communication system CPU 10-2 in accordance with the operation of the UI control portion 21 is that the power source processing portion 10-3 for carrying out the control of supplying the power to the respective portions of the apparatus is operated by utilizing the communication system CPU 10-2, as a result, power consumption can be reduced by carrying out the operation of the UI control portion 21 when the communication system CPU 10-2 carries out intermittent receiving operation.

However, the invention is not limited thereto. For example, the same goes even when the power source processing portion 10-3 is operated by utilizing the UI system CPU 20-2 without utilizing the communication system CPU 10-2. That is, when the power source processing portion 10-3 is needed to operate by carrying out the intermittent receiving operation by the communication system processing portion 10, as a result, the UI system CPU 20-2 is operated, the UI control portion 21 is operated, it is not necessary to newly start the UI system CPU 20-2 and power consumption can be reduced.

Further, for example, when the power source processing portion 10-3 does not utilize the communication CPU 10-2 and does not utilize the UI system CPU 20-2, in other words, the power source processing portion 10-3 is independent from the communication system processing portion 10 and is independent from the UI system processing portion 20, the same effect is achieved.

That is, in this case, in accordance with the operation of the UI control portion 21, the power source processing portion 10-3 is started. At this occasion, by operating the UI control portion 21 when the power source processing portion 10-3 is started by operating the communication system CPU 10-2, power consumed by the power source processing portion 10-3 can be reduced.

Next, an explanation will be given of a situation in which power consumed by the UI system CPU 20-2 is reduced by informing or not informing the determined quality level to the radio wave quality pict detecting portion 25 by the radio wave quality level determining portion 16. FIG. 12 illustrates timing charts of informing or not informing the quality level determined by the radio wave quality level determining portion 16, FIG. 12(a) shows a case of not informing and FIG. 12(b) shows a case of informing.

The radio wave quality level determining portion 16 utilizing the communication system CPU 10-2 determines the quality level by carrying out reception of the radio wave strength (T401, in correspondence with step S102 of a flowchart shown in FIG. 8), an averaging processing (T402, in correspondence with step S103 of the flowchart shown in FIG. 8), the hysteresis processing (T403, in correspondence with step S104 of the flowchart shown in FIG. 8) at each time of intermittent reception.

Next, when the determined quality level is the same as that determined in intermittent reception at the preceding time, as shown by FIG. 12(a), the radio wave quality level determining portion 16 finishes the operation. On the other hand, when the determined quality level differs from that determined in intermittent reception at the preceding time, as shown by FIG. 12(b), the radio wave quality level determining portion 16 successively informs the determined quality level (T404, in correspondence with step S107 of the flowchart shown in FIG. 8).

As a result of the informing, the radio wave quality pict selecting portion 25 utilizing the UI system CPU 20-2 receives an informed quality level and selects the pict image 26c in accordance with the quality level (T405, in correspondence with the flowchart shown in FIG. 10). That is, the UI system CPU 20-2 is started to be operated.

As is apparent by comparing FIG. 12(a) and FIG. 12(b), by not informing the quality level determined by the radio wave quality level determining portion 16 to the radio wave quality pict selecting portion 25, the UI system CPU 20-2 is not started and power is not consumed by the UI system CPU 20-2.

Figure 13:
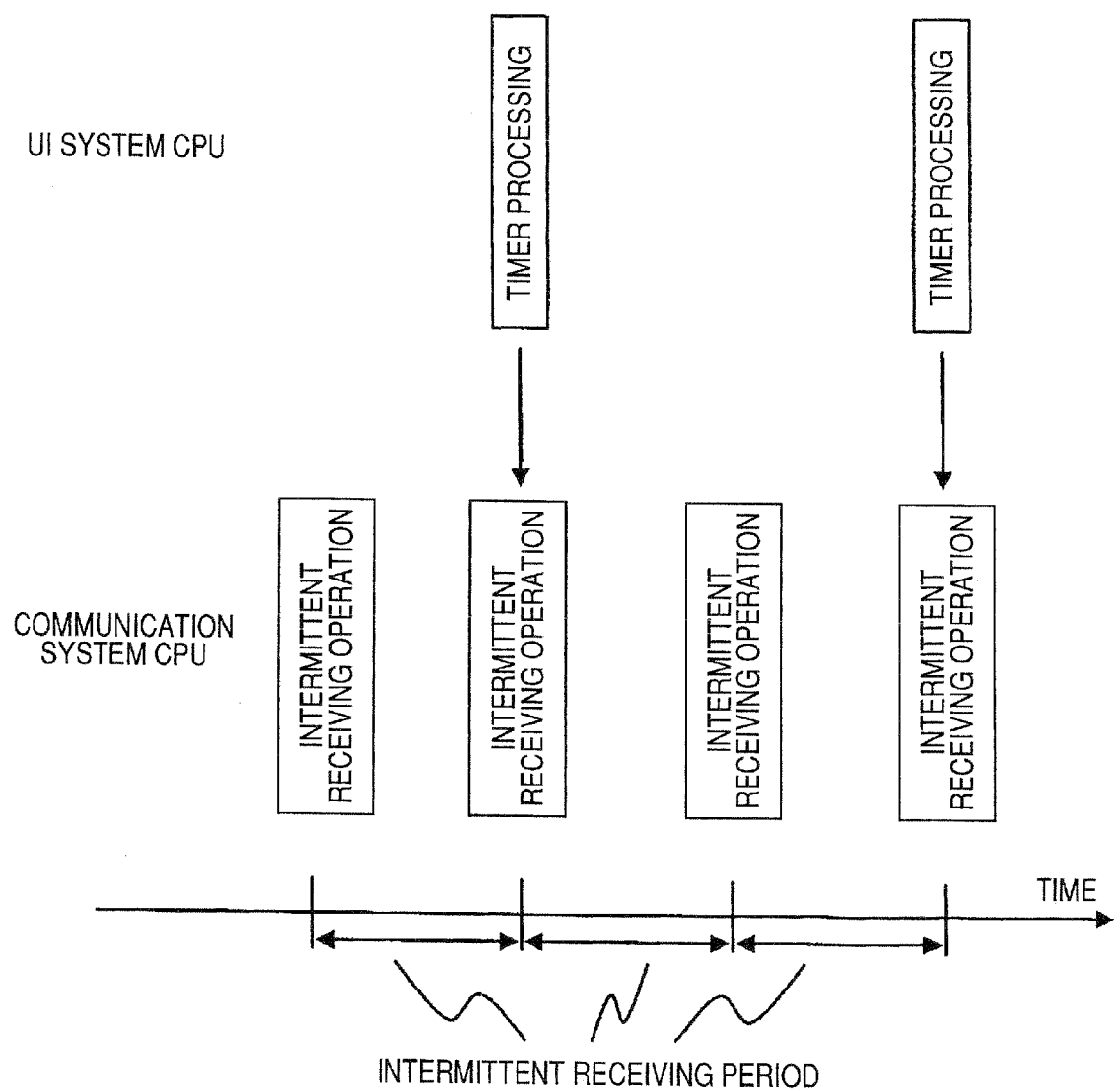
FIG. 13 is an exemplary timing chart comparing to show time of lighting an LED portion by a UI control portion and time of carrying out intermittent receiving operation by a communication system processing portion according to the embodiment of the invention.

Next, an explanation will be given of a situation of reducing power consumed by the communication system CPU 10-2 by setting time of lighting the LED 24 by the UI control portion 21 to time of carrying out intermittent reception by the communication system processing portion 10. FIG. 13 is a timing chart comparing to show time of lighting the LED portion 24 by the UI control portion 21 and time of carrying out intermittent receiving operation by the communication system processing portion 10.

The UI control portion 21 utilizing the UI system CPU 20-2 sets the timer such that the time is out at time of carrying out the intermittent receiving operation in order to set the time of lighting the LED portion 24 to the time of carrying out the intermittent receiving operation by the communication system processing portion 10. Then, as a result of needing an operation of the power source processing portion 10-3 for lighting the LED portion 24 by the UI control portion 21 in accordance with time out, the operation of the communication system CPU 20-2 is needed. However, when time is out, the communication system CPU 10-2 is operated to carry out the intermittent receiving operation, it is not necessary to newly start the communication system CPU 10-2 and power consumed by the communication system CPU 10-2 is reduced.

Figure 14:
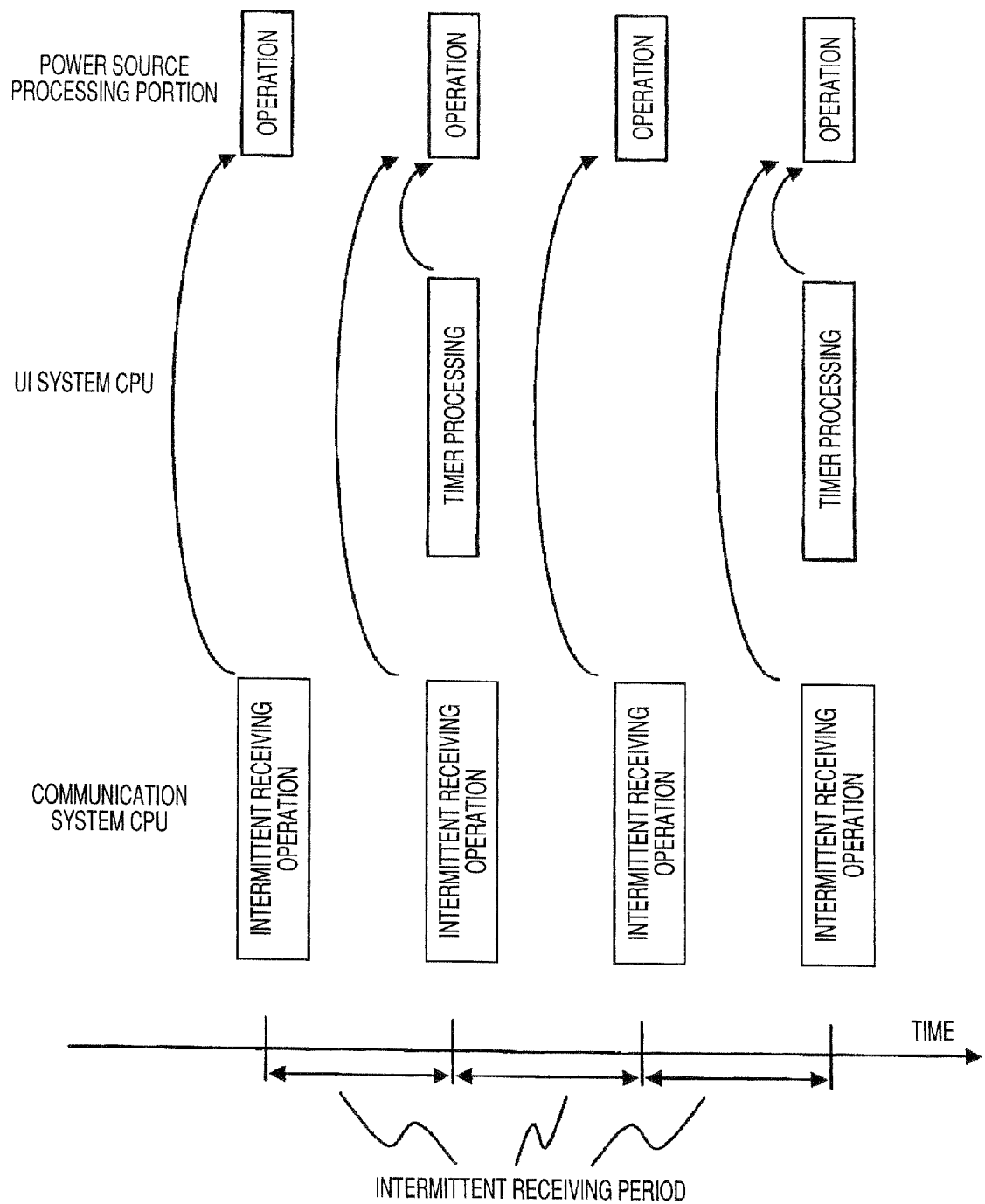
FIG. 14 is an exemplary timing chart comparing to show time of operating a power source processing portion, time of lighting the LED portion by the UI control portion, and time of carrying out the intermittent receiving operation by the communication system processing portion according to the embodiment of the invention.

Next, an explanation will be given of a situation of reducing power consumed by the power source processing portion 10-3 by setting time of lighting the LED 24 to time of carrying out the intermittent reception by the communication system processing portion 10 when the power source processing portion 10-3 does not belong to the communication system processing portion and does not belong to the UI system processing portion 20. FIG. 14 is a timing chart comparing to show time of operating the power source processing portion 10-3, time of lighting the LED portion 24 by the UI control portion 21, and time of carrying out intermittent receiving operation by the communication system processing portion 10.

The UI control portion 21 utilizing the UI system CPU 20-2 sets the timer such that time is out at time of carrying out the intermittent receiving operation in order to set time of lighting the LED portion 24 to the time of carrying out the intermittent receiving operation by the communication system processing portion 10. Here, the operation of the power source processing portion 10-3 is needed for lighting the LED portion 24 by the UI control portion 21 in accordance with time out.

In the time out, the power source processing portion 10-3 is operated as a result of operating the communication system CPU 10-2 for carrying out an intermittent receiving operation. That is, it is not necessary to operate the power source processing portion 10-3 in order to light the LED portion 24 by the UI control portion 21 and power consumed by the power source processing portion 10-3 is reduced.

Although in the above-described explanation, the radio wave quality history 17a, the quality level threshold 17b, and the quality level history 17c are stored to the radio wave quality data storing portion 17, the invention is not limited thereto. These may be embedded to a program constituting the radio wave quality level determining portion 16. Further, although the radio wave quality pict 26a is stored to the radio wave quality pict storing portion 26, the invention it not limited thereto. The radio wave quality pict 26a may be embedded to the radio wave quality pict selecting portion 25.

Although in the above-described explanation, the radio wave quality level determining portion 16 carries out the averaging processing and hysteresis processing (the respective processings correspond to the operation of step S103 and the operation of step s104 of the flowchart shown in FIG. 8), the invention is not limited thereto. The two processings or at least one of the processings may be provided as a program different from that of the radio wave quality level determining portion 16. Further, may be operated as different task.

Further, by the averaging processing and hysteresis processing carried out by the radio wave quality level determining portion 16, an effect of avoiding useless confusion of the user is achieved regardless of a number of CPU provided to the apparatus. Further, one or both of the averaging processing and the hysteresis processing can be saved. The invention is not limited to the above-described constitution but can variously be modified.

As described with reference to the embodiment, there is provided a mobile communication apparatus that determines whether it is pertinent to start operating an operation in which time of starting the operation is determined by a timer in accordance with an intermittent receiving operation and start operating a processing determined to be pertinent in accordance with the intermittent receiving operation.

As described with reference to the embodiment, there is provided a mobile communication apparatus that displays an image in correspondence with a radio wave quality level at a pict column of a display portion by smaller power consumption.

What is claimed is:

1. A mobile communication apparatus comprising:
a first processor;
a second processor;
an intermittent receiver that is operated using the first processor; and
a timer processing unit that is operated using the first processor and the second processor and configured to determine a start time of an operation thereof by performing a time-out control based on a timer,
wherein the timer processing unit sets the timer so that a time-out occurs at a given timing, to perform a first function to be started at the given timing,
wherein the timer processing unit sets the timer so that a time-out occurs at a time when the intermittent receiver is operated, to perform a second function to be started at an arbitrary timing, and
wherein a judgement is made by the timer processing unit to determine whether an operation using the second processor, for which a start time has been determined by the timer, is to be performed during operation of the intermittent receiver in order to start the operation using the second processor in accordance with a result of the judgement.

2. The mobile communication apparatus according to claim 1 further comprising:
a notification unit; and
a controller that is operated using the second processor to control the notification unit;
wherein the second function includes notifying a missed call by blinking the notification unit.

3. The mobile communication apparatus according to claim 1 further comprising:
a speaker; and
a controller that is operated using the second processor to control the speaker,
wherein the first function includes notifying that the given time has come by sounding from the speaker.

4. A mobile communication apparatus comprising:
a first processor;
a second processor;
an intermittent receiver that is operated using the first processor;
a timer processing unit that is operated using the second receiver and configured to determine a start time of an operation thereof by performing a time-out control based on a timer, and
a power unit configured to control power supply to the intermittent receiver and the timer unit and that is operated by the first processor;
wherein, when the second processor starts to operate, the second processor activates the first processor to operate the power unit if the first processor is inactive;
wherein the timer processing unit sets the timer so that a time-out occurs at a given timing, to perform a first function to be started at the given timing, and
wherein the timer processing unit sets the timer so that a time-out occurs at a time when the intermittent receiver is operated, to perform a second function to be started at an arbitrary timing.

5. The mobile communication apparatus according to claim 4 further comprising:
a notification unit; and
a controller that is operated using the second processor to control the notification unit;
wherein the second function includes notifying a missed call by blinking the notification unit.

6. The mobile communication apparatus according to claim 4 further comprising:
a speaker; and
a controller that is operated using the second processor to control the speaker,
wherein the first function includes notifying that the given time has come by sounding from the speaker.

7. The mobile communication apparatus according to claim 1, wherein when the timer processing unit determines as a result of the judgement that the operation using the second processor is not to be performed during operation of the intermittent receiver, the operation using the second processor is started at a time in accordance with an attribute of the operation.

8. A mobile communication apparatus comprising:
a first processor;
a second processor;
an intermittent receiver that is operated using the first processor;
an image selector that is operated using the second processor; and
a display configured to display an image data stored in a frame buffer;
wherein the intermittent receiver intermittently executes a receiving operation including:
(a) receiving radio wave transmitted from a base station and measuring a quality of the received radio wave;
(b) determining a quality level by comparing a measured quality with a threshold; and
(c) activating the second processor and transmitting the quality level to the image selector if the quality level differs from a quality level transmitted to the image selector at a previous time,
wherein, if the image selector receives the quality level transmitted from the intermittently receiver, the image selector selects an image data based on the received quality level to store the selected image data to the frame buffer.

9. The mobile communication apparatus according to claim 8, wherein the threshold used if the measured quality is larger than the quality measured at the previous time is larger than the threshold used if the measured quality is smaller than the quality measured in the intermittent receiving operation at the previous time, so that a determination of the quality level is provided with a hysteresis characteristic.

10. A mobile communication apparatus comprising:
a first processor;
a second processor;
an intermittent receiver that is operated using the first processor;
an image selector that is operated using the second processor; and
a display configured to display an image data stored in a frame buffer, wherein the intermittent receiver intermittently executes a receiving operation including:
(a) receiving radio wave transmitted from a base station and measuring a quality of the received radio wave;
(b) calculating a weighted average value from the measured quality and a quality measured in the intermittent receiving operation of a predetermined number of times of the past;
(c) determining a quality level by comparing the calculated weighted average value with a threshold; and
(d) activating the second processor and transmitting the quality level to the image selector if the quality level differs from a quality level determined at a previous time,
wherein, if the image selector receives the quality level transmitted from the intermittently receiver, the image selector selects an image data based on the received quality level to store the selected image data to the frame buffer.

11. The mobile communication apparatus according to claim 10, wherein, the threshold used if the calculated weighted average value is larger than a weight average value calculated at the previous time is larger than the threshold used if the calculated weighted average value is smaller than a weighted average value calculated in the intermittent receiving operation of the previous time, so that a determination of the quality level is provided with a hysteresis characteristic.

12. A mobile communication apparatus comprising:
a first processor;
a second processor;
an intermittent receiver that is operated using the first processor;
an image selector that is operated using the second processor, and
a display configured to display an image data stored in a frame buffer;
wherein the intermittent receiver intermittently executes a receiving operation including:
(a) receiving radio wave transmitted from a base station and measures a quality of the received radio wave;
(b) calculating a weighted average value from the measured quality and a quality measured in the intermittent receiving operation of a predetermined number of times of the past;
(c) determining a quality level by comparing the calculated weighted average value with a threshold; and
(d) activating the second processor and transmitting the quality level to the image selector if the quality level differs from a quality level transmitted to the image selector at a previous time,
wherein, if the image selector receives the quality level transmitted from the intermittently receiver, the image selector selects an image data based on the received quality level to store the selected image data to the frame buffer.

13. The mobile communication apparatus according to claim 12, wherein the threshold used if the calculated weighted average value is larger than a weight average value calculated at the previous time is larger than the threshold used f the calculated weighted average value is smaller than a weighted average value calculated in the intermittent receiving operation of the previous time, so that a determination of the quality level is provided with a hysteresis characteristic.

* * * * *